Sept. 23, 1958  W. J. F. ODDS  2,853,272
HOLLOW BLADES FOR TURBO MACHINES
Filed Sept. 8, 1953  2 Sheets-Sheet 1
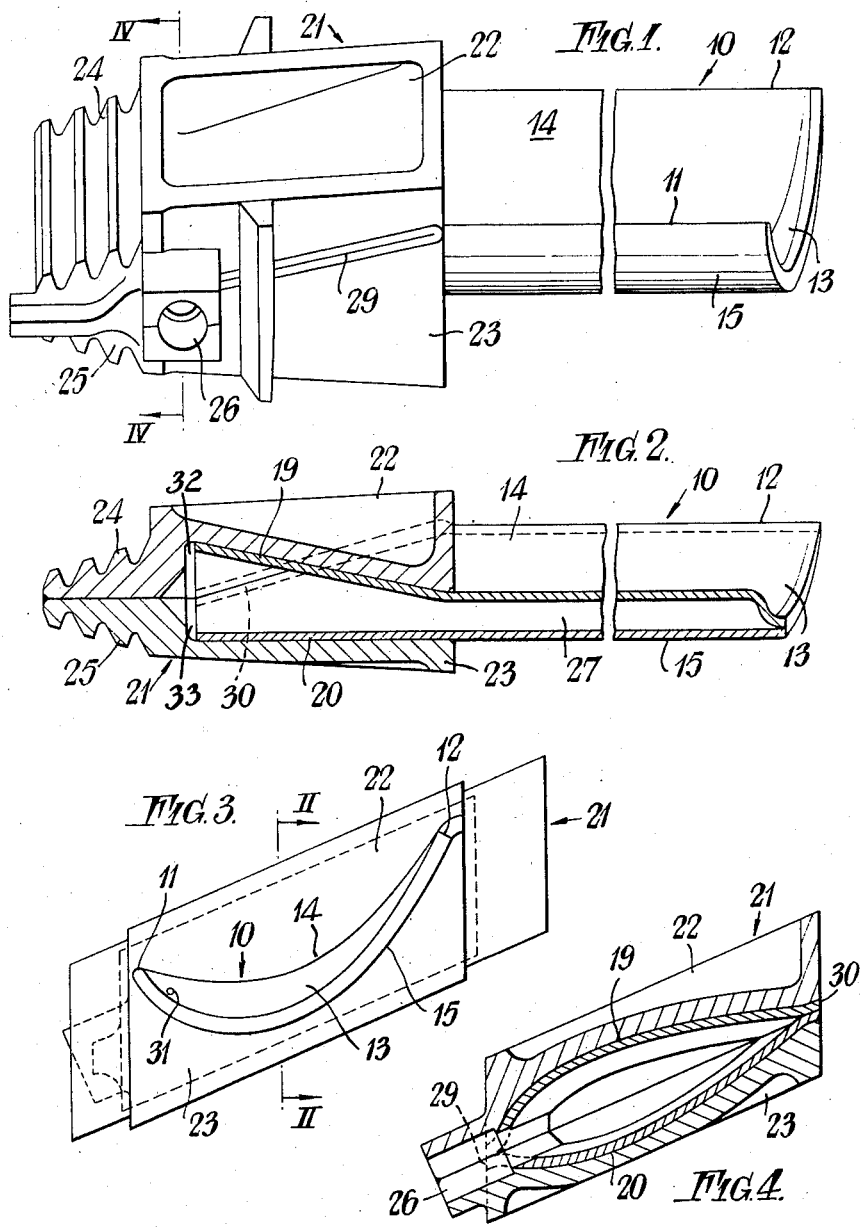

Sept. 23, 1958 W. J. F. ODDS 2,853,272
HOLLOW BLADES FOR TURBO MACHINES
Filed Sept. 8, 1953 2 Sheets-Sheet 2
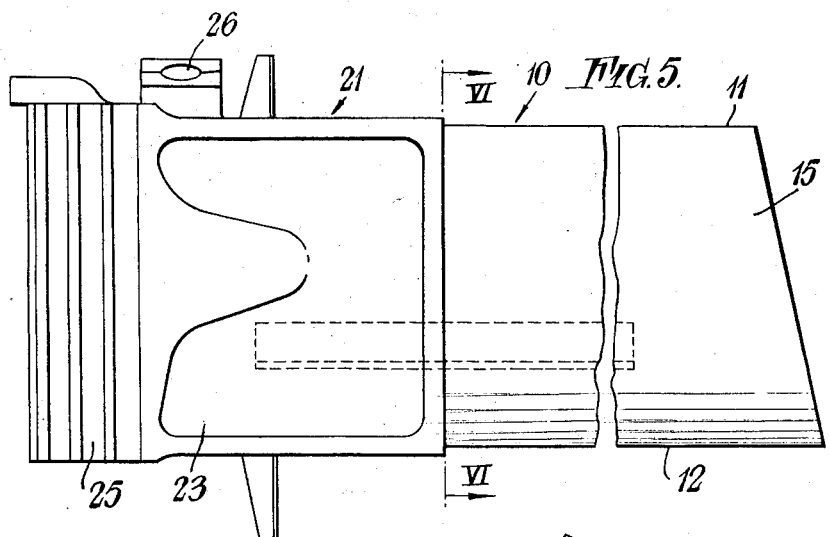
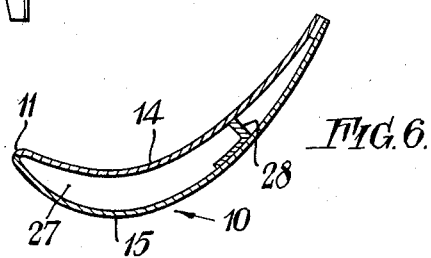
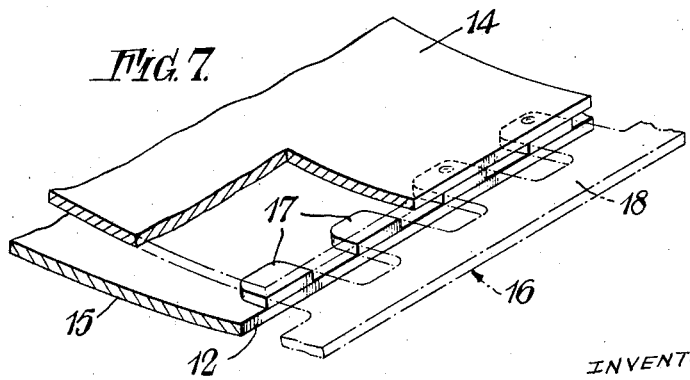
INVENTOR
William J. F. Odds
By Watson, Cole, Grindle &
Watson
ATTORNEYS

United States Patent Office 2,853,272
Patented Sept. 23, 1958

2,853,272

HOLLOW BLADES FOR TURBO MACHINES

William James Frederick Odds, Ruislip, England, assignor to D. Napier & Son Limited, London, England, a company of Great Britain Application September 8, 1953, Serial No. 378,935

Claims priority, application Great Britain September 12, 1952

4 Claims. (Cl. 253—39.15)

This invention relates to hollow blades for turbo machines, that is to say either turbines or axial flow compressors, whether these blades be mounted on the rotor or on the stator.

A common method of making blades for turbo machines is to forge and machine them from a solid block of material, but such methods are difficult where a hollow blade is required. Another method of making hollow blades has been from tubes, which are manipulated into the required shape, but the manufacture of such blades involves difficulties.

It is an object of the present invention to provide an improved form of hollow blade which can be manufactured in a relatively simple manner.

According to the present invention a blade for a turbo machine has a blade portion formed from sheet metal manipulated into a hollow areofoil section and a root portion made in two parts having internal recesses which respectively receive formations on the ends of the sheet metal flanks of the blade portions.

Preferably the arrangement is such that the front and rear edges of the said formations of the blade portions abut and are exposed, and these edges are secured together and to adjacent exposed areas of the two parts of the root portion, for instance by welding, providing a unitary blade assembly.

In one form of the invention the blade portion is made from a single piece of sheet metal with a fold constituting the leading edge of the blade and with two opposite edges of the piece constituting the trailing edge of the blade.

In an alternative form two pieces of sheet metal are employed, one for each flank of the blade, two edges of the pieces being joined together to constitute the leading edge of the blade and two other edges of the pieces constituting the trailing edge of the blade.

Preferably the edges of the piece or pieces of sheet metal which constitute the trailing edge of the blade are not connected together directly, but have spacers interposed between them at intervals to define a row of apertures along the trailing edge through which a coolant introduced into the root portion of the blade can escape after having passed through the hollow interior of the blade.

In one form of the invention there may be a baffle extending part way along the hollow interior of the blade for directing a coolant, introduced into the root portion, outwardly along the interior of the leading edge of the blade.

Conveniently, where provision is made for introducing coolant through the root portion of the blade the passage through which the coolant is introduced may be formed partly in one part of the root portion and partly in the other part.

One form of the invention, namely a turbine rotor blade, will now be specifically described by way of example with reference to the accompanying drawings, in which:

Figure 1 is a front elevation of the blade assembly;
Figure 2 is a longitudinal section taken on the line II—II in Figure 3;
Figure 3 is a plan view of the blade assembly;
Figure 4 is a cross-section taken on the line IV—IV in Figure 1;
Figure 5 is a side elevation of the blade assembly;
Figure 6 is a cross-section of the blade taken on the line VI—VI in Figure 5; and
Figure 7 is a fragmentary perspective view showing the construction of the trailing edge of the blade.

The blade portion 10 of the blade assembly shown in the drawings is made from two flat sheets of suitable metal, for instance nickel chrome steel, the two sheets being manipulated to produce a hollow areofoil section with a concave flank 14 and a convex flank 15 with the adjacent edges of the sheets abutting at the leading edge 11 and the trailing edge 12 of the blade.

At the outer extremity of the blade the marginal portion 13 of the concave flank 14 is bent over until it meets the marginal portion of the convex flank 15.

Between the two edges of the sheet which constitute the trailing edge 12 of the blade is inserted a spacer element. This is originally in the shape of a comb 16 (Figure 7), the teeth 17 of which project between the said edges of the sheet but the back 18 of which lies wholly beyond the limits of these edges.

The inner ends 19 and 20 (Figure 4) of the blade portion 10 are manipulated so as to provide a formation of approximately elliptical shape.

The blade root portion 21 is made in two parts 22 and 23. The part 22 has in it a recess 32 to receive the inner end formation 19 of the concave flank 14, while the part 23 has in it a recess 33 for receiving the inner end formation 20 of the convex flank 15. In addition, each part of the root portion has a tail piece, 24 and 25 respectively, shaped as one half of a "fir-tree" type blade fixing formation. In each part, moreover, there is a semi-cylindrical recess which, when the two parts are brought together, form a passage 26 through which coolant can be introduced into the hollow interior 27 of the blade portion, for instance from an open-sided annular gallery in a fixed part (not shown) of the turbine adjacent to the rotor.

Within the hollow interior 27 of the blade is a longitudinal baffle 28, which may be welded to the part of the sheet which is to form one of the flanks before the sheet is manipulated into aerofoil form.

To assemble the blade, the two halves 22 and 23 of the root portion are brought together around the inner end formations 19 and 20 of the blade portion 10. The front and rear edges of the said inner end formations abut and are exposed between adjacent areas of the front and rear surfaces of the two halves of the root portion as shown at 29 and 30. The two halves 22 and 23 of the root portion and the exposed edges 29 and 30 of the said inner formations are then all welded together to form a unitary blade assembly. If desired the inner end formations 19 and 20 may be brazed to the appropriate recesses in the halves of the root portion. The spacer 16 along the trailing edge 12 of the blade is cut off flush with the two rear edges of the sheet so as to leave only the tips 17 of the teeth of the comb between these edges, the tips being spaced apart by gaps. The welding is then continued up the trailing edge 11 to weld the spacers 17 to the rear edges of the sheets. The outer marginal portions of the flanks of the blade are also welded together.

There is thus a series of apertures along the trailing edge 12 of the blade through which coolant introduced through passage 26 in the root portion can escape after having flowed outwardly through the hollow centre of the blade in front of the baffle 28, over the end of this baffle and down behind it. In place of the baffle 28, or in addition to it, in order to avoid the risk of coolant accumulating adjacent to the outer part of the leading edge 11 of the blade a small hole 31 (Figure 3) may be formed in the stepped marginal portion 13 of the blade near to the leading edge 11, through which some of the coolant can continually escape.

What I claim as my invention and desire to secure by Letters Patent is:

1. A blade for a turbo machine having a blade portion and a root portion, the blade portion being hollow and formed from two pieces of sheet metal with their edges adjacent one another, while the root portion comprises two separate cooperating elements formed with recesses on their adjacent faces to define a duct through which coolant is admitted to the hollow interior of the blade portion, and to receive one end of the blade portion, with the leading and trailing edges of this end of the blade portion exposed sandwichwise between the adjacent edges of the two cooperating elements, said adjacent edges of the cooperating elements being welded to the said exposed leading and trailing edges of the blade portion to provide a unitary blade structure.

2. A blade as claimed in claim 1, in which the trailing edge of the blade portion is formed by two adjacent edges of sheet metal, and including a series of spanwise spaced spacer elements interposed between the two adjacent edges to define a row of apertures along said trailing edge.

3. A blade as claimed in claim 1, in which the blade portion is formed from two pieces of sheet metal with their edges adjacent one another at the leading and trailing edges of the blade.

4. A blade as claimed in claim 3, including a series of spanwise spaced spacer elements interposed between the two adjacent edges of the two pieces of sheet metal at the trailing edge of the blade, to define a series of apertures along said trailing edge.

References Cited in the file of this patent

UNITED STATES PATENTS

| | | |
|---|---|---|
| 1,516,607 | Johanson | Nov. 25, 1924 |
| 2,563,269 | Price | Aug. 7, 1951 |
| 2,618,120 | Papini | Nov. 18, 1952 |
| 2,647,368 | Triebbnigg | Aug. 4, 1953 |
| 2,650,803 | Rosskopf | Sept. 1, 1953 |
| 2,656,146 | Sollinger | Oct. 20, 1953 |

FOREIGN PATENTS

| | | |
|---|---|---|
| 133,353 | Australia | July 14, 1949 |
| 878,999 | France | Nov. 2, 1942 |
| 991,982 | France | June 27, 1951 |